(12) United States Patent
Jung et al.

(10) Patent No.: US 9,590,489 B2
(45) Date of Patent: Mar. 7, 2017

(54) CONVERTER (71) Applicant: HYOSUNG CORPORATION, Seoul (KR)

(72) Inventors: Hong Ju Jung, Seoul (KR); Tae Gyun Kim, Seoul (KR); Hang Jun Yang, Seoul (KR); Jong Yun Choi, Hwaseong-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 14/758,095

(22) PCT Filed: Dec. 27, 2013

(86) PCT No.: PCT/KR2013/012342
§ 371 (c)(1),
(2) Date: Jun. 26, 2015

(87) PCT Pub. No.: WO2014/104836
PCT Pub. Date: Jul. 3, 2014

(65) Prior Publication Data
US 2015/0357906 A1 Dec. 10, 2015

(30) Foreign Application Priority Data
Dec. 28, 2012 (KR) ........................ 10-2012-0157390

(51) Int. Cl.
*H02M 1/32* (2007.01)
*H02M 1/00* (2006.01)
(Continued)

(52) U.S. Cl.
CPC ............... *H02M 1/32* (2013.01); *H02M 1/00* (2013.01); *H02M 7/483* (2013.01);
(Continued)

(58) Field of Classification Search
CPC ........ H02M 2/5387; H02M 1/32; H02M 7/49; H02M 2007/4835; H02M 7/483; H02M 2001/007
(Continued)

(56) References Cited

U.S. PATENT DOCUMENTS 4,117,364 A 9/1978 Baker
6,198,178 B1 3/2001 Schienbein et al.
(Continued)

OTHER PUBLICATIONS

R. Marquardt "Modular Multileavel Converter : An universal concept for HVDC-Networks and extended DC-Bus applications," IEEE IPEC (Jun. 2010) pp. 502-507.

*Primary Examiner* — Gary L Laxton
*Assistant Examiner* — Kyle J Moody
(74) *Attorney, Agent, or Firm* — Novick, Kim & Lee, PLLC; Jae Youn Kim (57) ABSTRACT

The present invention provides a converter including a plurality of sub-modules connected in series to each other, wherein each of the sub-modules includes a first half-bridge unit including a first energy storage unit, and a plurality of first power semiconductors connected in parallel to the first energy storage unit and connected in series to each other; a second half-bridge unit including a second energy storage unit, and a plurality of second power semiconductors connected in parallel to the second energy storage unit and connected in series to each other; and an auxiliary circuit unit connecting the first half-bridge unit and the second half-bridge unit; wherein the auxiliary circuit unit includes a single third power semiconductor and a single diode.

5 Claims, 7 Drawing Sheets (51) Int. Cl.
*H02M 7/5387* (2007.01)
*H02M 7/483* (2007.01)

(52) U.S. Cl.
CPC .... *H02M 7/5387* (2013.01); *H02M 2001/007* (2013.01); *H02M 2007/4835* (2013.01)

(58) Field of Classification Search
USPC ............................... 363/127, 129, 132, 137
See application file for complete search history.

(56) References Cited

U.S. PATENT DOCUMENTS

| | | | |
|---|---|---|---|
| 6,519,169 B1 | 2/2003 | Asplund et al. | |
| 6,621,719 B2 | 9/2003 | Steimer et al. | |
| 8,817,504 B2* | 8/2014 | Zhang .................. | H02M 7/483 363/71 |
| 9,350,270 B2* | 5/2016 | Park ........................ | H02M 1/12 |
| 2005/0083716 A1* | 4/2005 | Marquardt ............ | H02M 5/271 363/132 |
| 2012/0243282 A1* | 9/2012 | Marquardt .............. | H02M 7/49 363/132 |
| 2015/0229234 A1* | 8/2015 | Park ........................ | H02M 1/12 363/78 |
| 2015/0256081 A1* | 9/2015 | Bakran ............. | H02M 3/33584 363/21.01 |
| 2015/0333660 A1* | 11/2015 | Kim ..................... | H02M 7/483 363/123 |
| 2015/0365011 A1* | 12/2015 | Ilves ........................ | H02J 3/36 363/126 |

\* cited by examiner

Prior Art

FIG. 1

Prior Art

FIG. 2

Prior Art

FIG. 3

Prior Art

FIG. 4

Prior Art

CONVERTER

TECHNICAL FIELD

The present invention relates to a converter and, more particularly, to a converter in which a plurality of sub-modules, each including an energy storage unit and power semiconductors, is connected in series to each other, wherein each of the sub-modules is configured by adding a simple and inexpensive auxiliary circuit unit between two half-bridge units, and thus fault current is allowed to flow into the energy storage unit of each half-bridge unit, thereby blocking or reducing the fault current.

BACKGROUND ART

In the case of a High Voltage Direct Current (HVDC) transmission converter, a power semiconductor that can be turn-on/turn-off controlled is used in order to perform conversion between alternating current (AC) voltage and direct current (DC) voltage. Since the withstanding voltage of the power semiconductor is limitative, a plurality of semiconductor modules having power semiconductor circuits must be connected in series in order to perform high voltage processing. In order to configure the power semiconductor circuits, various semiconductor modules may be connected to each other.

As is well known, a well-known Modular Multilevel Converter (MMC) includes a plurality of sub-modules in which such power semiconductor circuits form two output terminals X1 and X2, and these plurality of sub-module is connected in series. Each of the sub-modules includes, for example, an energy storage unit and power semiconductors. The power semiconductors may be implemented using power semiconductor switches and freewheeling diodes, for example, IGBTs. This sub-module includes a so-called half-bridge or full-bridge circuit in which a plurality of power semiconductors is connected to each other. Furthermore, in the sub-modules of the MMC converter, one of the voltage of the energy storage units, zero voltage or the polarity-reversed voltage of the energy storage units appears at two output terminals.

Figure 1:
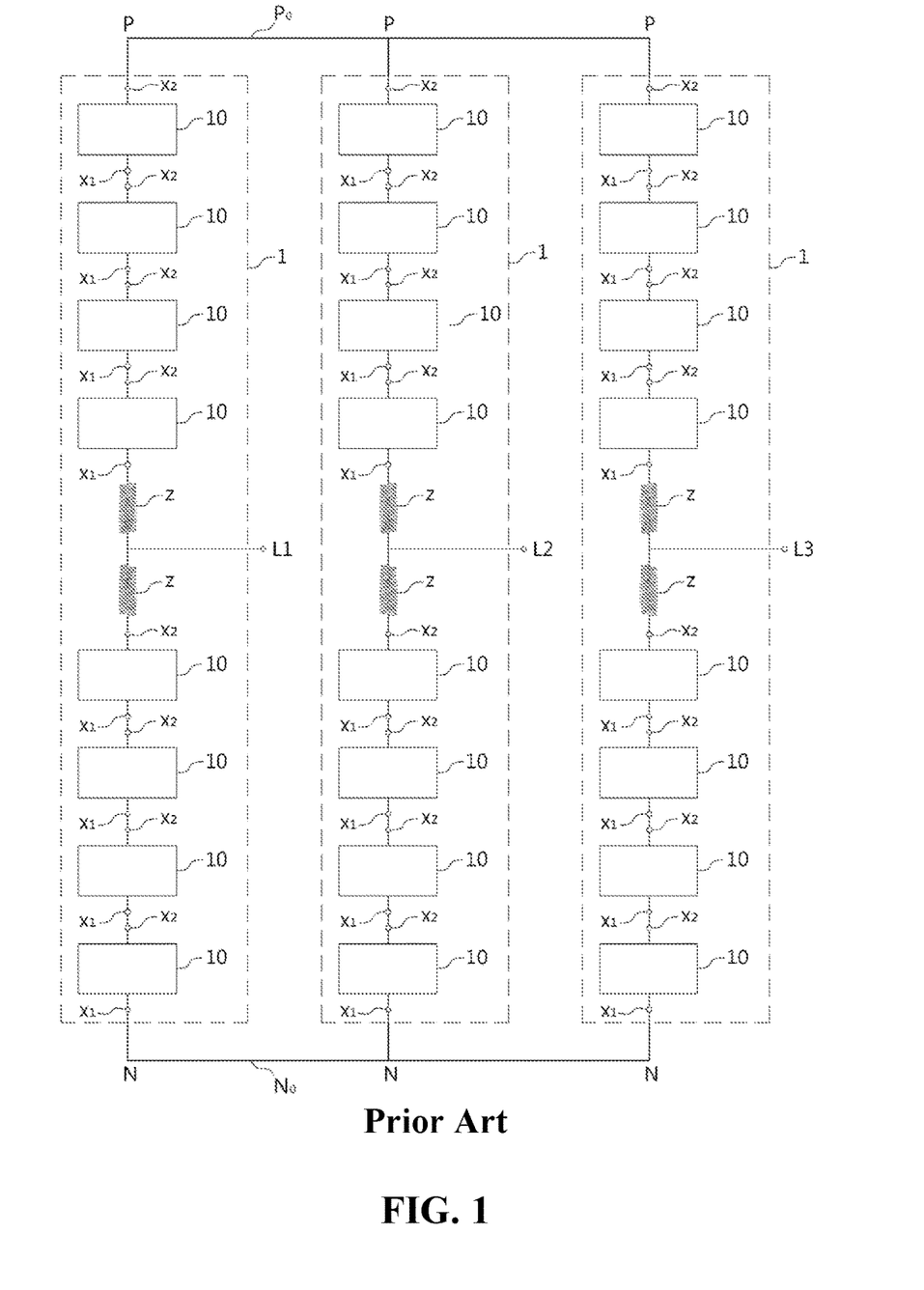
FIG. 1 is an equivalent circuit diagram showing a conventional well-known converter.

In FIG. 1, a well-known MMC converter is shown. In this converter, one or more phase modules 1 are provided, and each of the phase modules 1 is configured such that a plurality of sub-modules 10 is connected in series to each other. As load connection terminals, AC voltage-side terminals L1, L2 and L3 may be connected to a three-phase load, for example, a three-phase AC power system.

Figure 2:
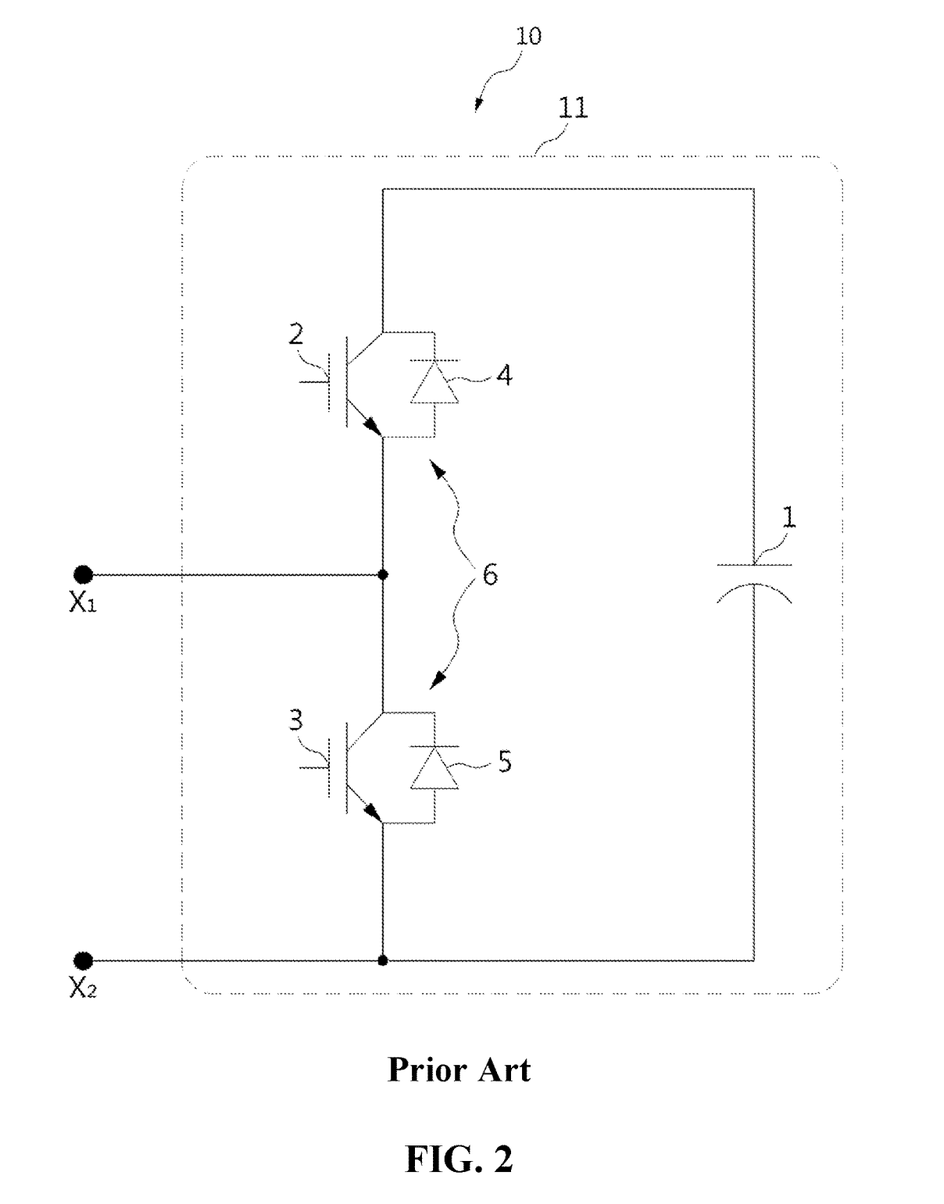
FIG. 2 is a diagram of an exemplary configuration of the sub-module of the converter of FIG. 1.

In FIG. 2, an example of the equivalent circuit of such a sub-module 10 is shown. In the example of FIG. 2, the sub-module 10 includes a single half-bridge unit 11. The half-bridge unit 11 includes an energy storage unit 1 and a plurality of power semiconductors 6 connected in parallel to the energy storage unit 1. The power semiconductors 6 may be configured using power semiconductor switches 2 and 3 configured to be turn-on/turn-off controlled and freewheeling diodes 4 and 5. However, the sub-module 10 of FIG. 2 is problematic in that the sub-module 10 is damaged by high fault current.

Figure 3:
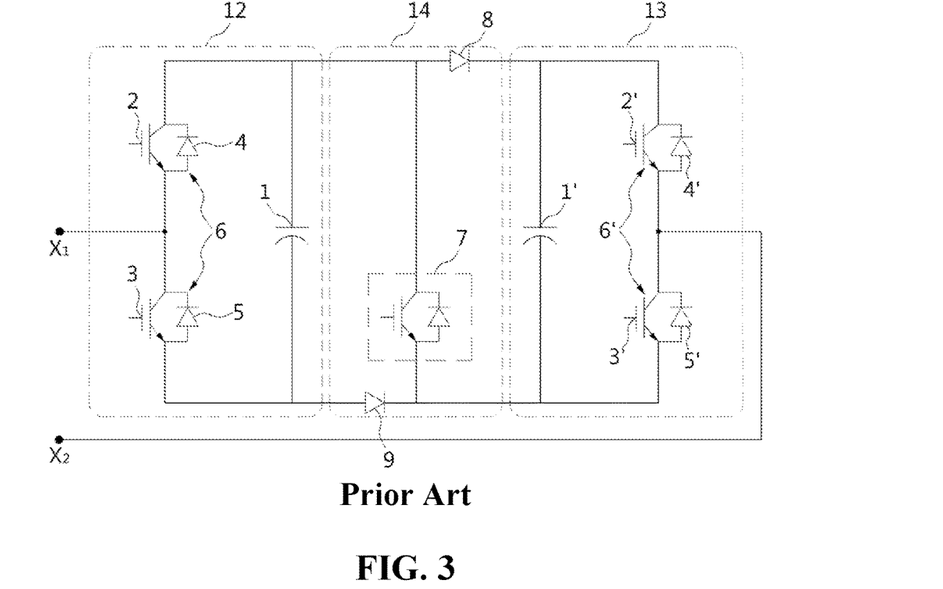
FIG. 3 is a diagram of another exemplary configuration of the sub-module of the converter of FIG. 1.

In order to mitigate the above problem, a conventional method in which an auxiliary circuit unit was added between two half-bridge units, as shown in FIG. 3, was presented. In FIG. 3, another example of the equivalent circuit of the sub-module 10 is shown. In the sub-module 10 shown in the example of FIG. 3, two half-bridge units 12 and 13 are disposed on both sides and an auxiliary circuit unit 14 is added therebetween. In this case, the auxiliary circuit unit 14 includes one power semiconductor 7 and two diodes 8 and 9. By doing so, fault current is allowed to flow into the energy storage units 1 and 1' of both half-bridge units 12 and 13, and thus the fault current is blocked or reduced. These flows of fault current in FIG. 3 are shown in FIGS. 4 and 5.

Figure 4:
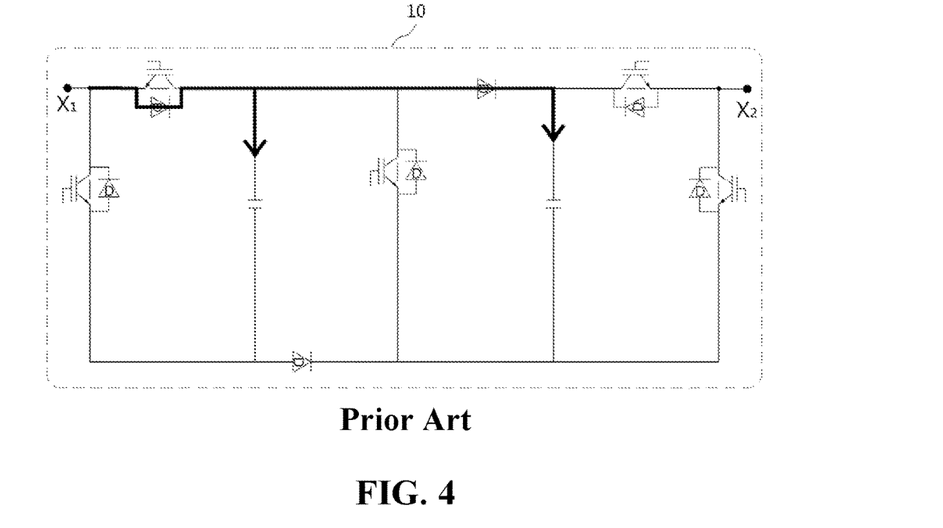
FIG. 4 is a diagram showing the flows of fault current according to a conventional example.
Figure 5:
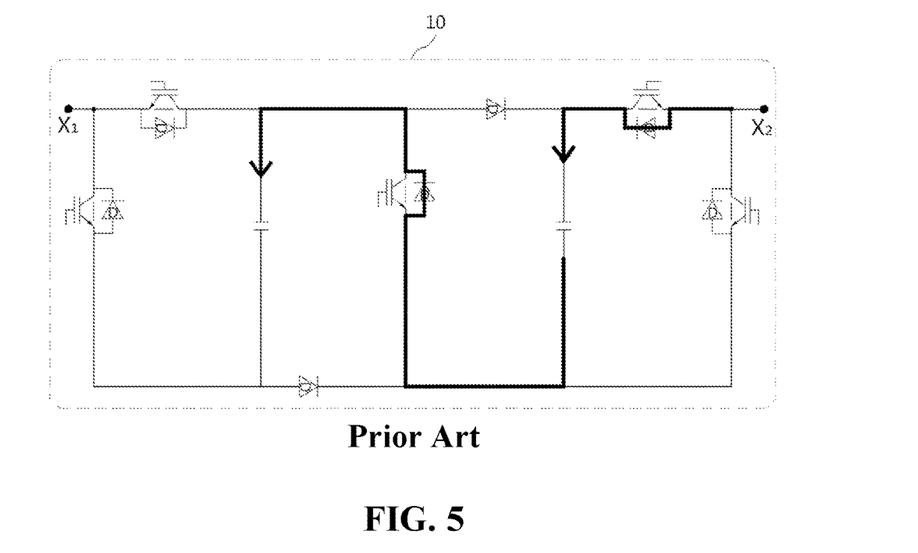
FIG. 5 is a diagram showing the flows of fault current according to another conventional example.

FIGS. 4 and 5 are diagrams showing the flows of fault current in the conventional sub-module. In FIG. 4, fault current from a system (in the direction of X1→X2) flows into the first energy storage unit 1 through the first power semiconductor 6 of the first half-bridge unit 12, and, at the same time, flows into the second energy storage unit 1' through the diode 8 of the auxiliary circuit unit 14. Furthermore, in FIG. 5, fault current (in the direction of X2→X1) flows into the second energy storage unit 1' through the second power semiconductor 6' of the second half-bridge unit 13, and, at the same time, flows into the first energy storage unit 1 through the third power semiconductor 7 of the auxiliary circuit unit 14.

Meanwhile, recently, as research into such auxiliary circuit units has been carried out, there has been a demand for a technology that is capable of simplifying the configuration of an auxiliary circuit unit and reducing the manufacturing cost thereof while implementing performance and efficiency equal to or higher than those of the conventional technology.

DISCLOSURE

Technical Problem

Accordingly, the present invention has been made in response to the above problems of the conventional technology and the technical demand, and an object of the present invention is to provide a converter in which each sub-module of the converter is configured using two half-bridge units and an auxiliary circuit unit disposed between the two half-bridge units and configured to be simpler and less inexpensive than that of the conventional technology, and thus fault current is allowed to flow into the energy storage unit of each half-bridge unit, thereby blocking or reducing the fault current.

Technical Solution

In order to accomplish the above object, the present invention provides a converter including a plurality of sub-modules connected in series to each other, wherein each of the sub-modules includes a first half-bridge unit including a first energy storage unit, and a plurality of first power semiconductors connected in parallel to the first energy storage unit and connected in series to each other; a second half-bridge unit including a second energy storage unit, and a plurality of second power semiconductors connected in parallel to the second energy storage unit and connected in series to each other; and an auxiliary circuit unit connecting the first half-bridge unit and the second half-bridge unit; wherein the auxiliary circuit unit includes a single third power semiconductor and a single diode.

In the present invention, the (+) terminal of the first energy storage unit and the (−) terminal of the second energy storage unit may be connected through the third power semiconductor, and the (−) terminal of the first energy storage unit and a (+) terminal of the second energy storage unit may be connected through the diode.

In the present invention, the emitter terminal of the third power semiconductor may be connected to the (−) terminal of any one of the first and second energy storage unit.

In the present invention, when fault current flows into the sub-module, the fault current may be supplied to each energy storage unit of the first and second half-bridge units through any one of the third power semiconductor and diode of the auxiliary circuit unit.

In the present invention, the fault current may be supplied to the energy storage unit through the diode of the auxiliary circuit unit when the fault current flows from a system to a DC side, and the fault current may be supplied to the energy storage unit through the third power semiconductor of the auxiliary circuit unit when the fault current flows from the DC side to the system.

In the present invention, the third power semiconductor may be connected in parallel to the first energy storage unit, and the diode may be connected in series to the first energy storage unit.

In the present invention, the (−) terminal of the first energy storage unit may be connected to an anode (+) terminal of the diode, and the cathode (−) terminal of the diode may be connected to the emitter terminal of the third power semiconductor.

In the present invention, the third power semiconductor may be connected in parallel to the second energy storage unit, and the diode may be connected in series to the second energy storage unit. In the present invention, the (+) terminal of the second energy storage unit may be connected to the cathode (−) terminal of the diode, and the anode (+) terminal of the diode may be connected to the collector terminal of the third power semiconductor.

Advantageous Effects

The converter according to the present invention, which is configured as described above, can achieve the following effects.

According to the present invention, in the implementation of a plurality of sub-modules applied to the converter, the present invention has the effects of simplifying the configuration thereof and reducing the implementation cost thereof compared to the conventional technology.

Furthermore, according to the present invention, in the converter, each of the plurality of sub-modules is implemented using two half-bridge units and an auxiliary circuit unit disposed therebetween, and thus fault current is allowed to flow into the energy storage unit of each half-bridge unit, thereby blocking or reducing the fault current.

MODE FOR INVENTION

Preferred embodiments of the present invention will be described in detail below with reference to the accompanying diagrams. In the following description of the present invention, if it is determined that detailed descriptions of related well-known functions or configurations unnecessarily make the gist of the present invention obscure, the detailed descriptions are omitted.

The present invention provides a converter. In this converter, a plurality of sub-modules each including an energy storage unit and power semiconductors are connected in series to each other. Each of the sub-modules is designed to reduce or block fault current. This is described in detail below.

Figure 6:
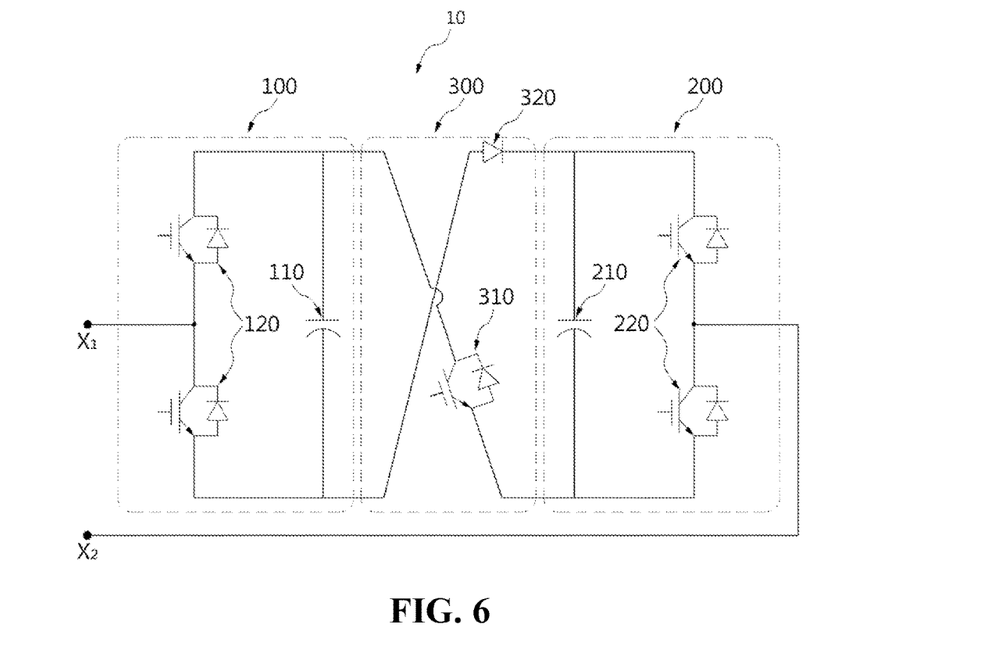
FIG. 6 is a diagram showing the configuration of a sub-module of a converter according to an embodiment of the present invention.

FIG. 6 is a diagram showing the configuration of a sub-module of a converter according to an embodiment of the present invention.

As shown in FIG. 6, each sub-module 10 of the converter according to the embodiment of the present invention includes a first half-bridge unit 100 and a second half-bridge unit 200, and an auxiliary circuit unit 300 is disposed between the first and second half-bridge units 100 and 200. The auxiliary circuit unit 300 functions to connect the first and second half-bridge units 100 and 200.

The first half-bridge unit 100 includes a first energy storage unit 110, and a plurality of first power semiconductors 120 connected in parallel to the first energy storage unit 110 and connected in series to each other. The second half-bridge unit 200 includes a second energy storage unit 210, and a plurality of second power semiconductors 220 connected in parallel to the second energy storage unit 210 and connected in series to each other. Although the number of first and second power semiconductor 120 and 220 is shown as being two as an example in FIG. 6, the present invention is not limited thereto. These power semiconductors 120 and 220 may be turned on/off in response to signals of a control unit (not shown). Furthermore, in the sub-module 10 of the present embodiment, a first output terminal X1 is connected to a neutral point between the two power semiconductors 120 of the first half-bridge unit 100, and a second output terminal X2 is connected to a neutral point between the two power semiconductors 220 of the second half-bridge unit 200.

Furthermore, the auxiliary circuit unit 300 includes a single third power semiconductor 310 and a single diode 320. In this case, as shown in an embodiment of FIG. 6, the (+) terminal of the first energy storage unit 110 of the first half-bridge unit 100 and the (−) terminal of the second energy storage unit 210 of the second half-bridge unit 200 의 are connected to each other through the third power semiconductor 310 of the auxiliary circuit unit 300, and the (−) terminal of the first energy storage unit 110 and the (+) terminal of the second energy storage unit 210 are connected to each other through the diode 320 of the auxiliary circuit unit 300. In this case, the emitter terminal of the third power semiconductor 310 is connected to the (−) terminal of any one of the first and second energy storage units 110 and 210.

In the sub-module 10 having the above configuration, when fault current flows from a system or fault current flows from a DC side, the fault current is allowed to flow into the first energy storage unit 110 and the second energy storage unit 210 through any one of the third power semiconductor 310 and diode 32 of the auxiliary circuit unit 300, thereby blocking or reducing the fault current. This flow of the fault current will be more specifically described in the following description.

Figure 7:
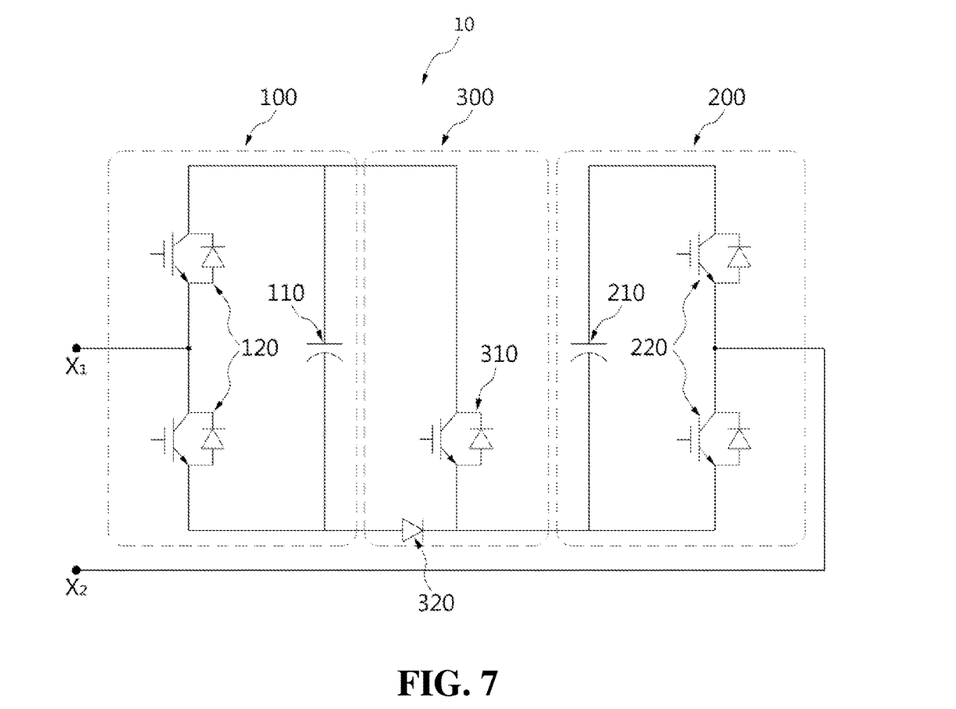
FIG. 7 is a diagram showing the configuration of a sub-module of a converter according to another embodiment of the present invention.

FIG. 7 is a diagram showing the configuration of a sub-module of a converter according to another embodiment of the present invention.

As shown in FIG. 7, each sub-module 10 of the converter according to this embodiment of the present invention also includes a first half-bridge unit 100 and a second half-bridge unit 200, and an auxiliary circuit unit 300 is disposed between the first and second half-bridge units 100 and 200. This configuration is the same as that of FIG. 6. However, some of the internal configuration of the auxiliary circuit unit 300 are different from those of FIG. 6.

That is, the auxiliary circuit unit 300 shown in FIG. 7 includes a single third power semiconductor 310 and a single diode 320, the third power semiconductor 310 is connected in parallel to the first energy storage unit 110 of the first half-bridge unit 100, and diode 320 is connected in series to the first energy storage unit 110. In this case, the (−) terminal of the first energy storage unit 110 and the anode (+) terminal of the diode 320 are connected to each other, and the cathode (−) terminal of the diode 320 and the emitter terminal of the third power semiconductor 310 are connected to each other.

Also in the sub-module 10 having this configuration, when fault current flows from a system or fault current flows from a DC side, the fault current is allowed to flow into the first energy storage unit 110 and the second energy storage unit 210 through any one of the third power semiconductor 310 and diode 32 of the auxiliary circuit unit 300, thereby blocking or reducing the fault current.

Figure 8:
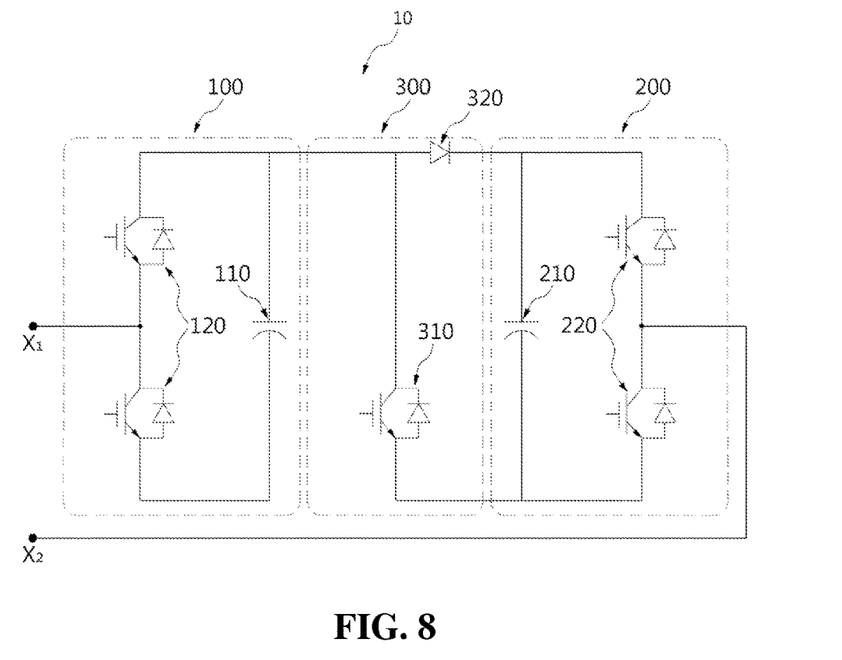
FIG. 8 is a diagram showing the configuration of a sub-module of a converter according to still another embodiment of the present invention.

FIG. 8 is a diagram showing the configuration of a sub-module of a converter according to still another embodiment of the present invention.

As shown in FIG. 8, each sub-module 10 of the converter according to this embodiment of the present invention also includes a first half-bridge unit 100 and a second half-bridge unit 200, like those of FIGS. 6 and 7, and an auxiliary circuit unit 300 is disposed between the first and second half-bridge units 100 and 200. However, some of the auxiliary circuit unit 200 of FIG. 8 are different in its internal configuration from those of FIGS. 6 and 7.

That is, the auxiliary circuit unit 300 shown in FIG. 8 includes a single third power semiconductor 310 and a single diode 320, the third power semiconductor 310 is connected in parallel to the second energy storage unit 210 of the second half-bridge unit 200, and the diode 320 is connected in series to the second energy storage unit 210. In this case, the (+) terminal of the second energy storage unit 210 and the cathode (−) terminal of the diode 320 are connected to each other, and the anode (+) terminal of the diode 320 and the collector terminal of the third power semiconductor 310 are connected to each other.

Also in the sub-module 10 having this configuration, when fault current flows from a system or fault current flows from a DC side, the fault current is allowed to flow into the first energy storage unit 110 and the second energy storage unit 210 through any one of the third power semiconductor 310 and diode 32 of the auxiliary circuit unit 300, thereby blocking or reducing the fault current.

Figure 9:
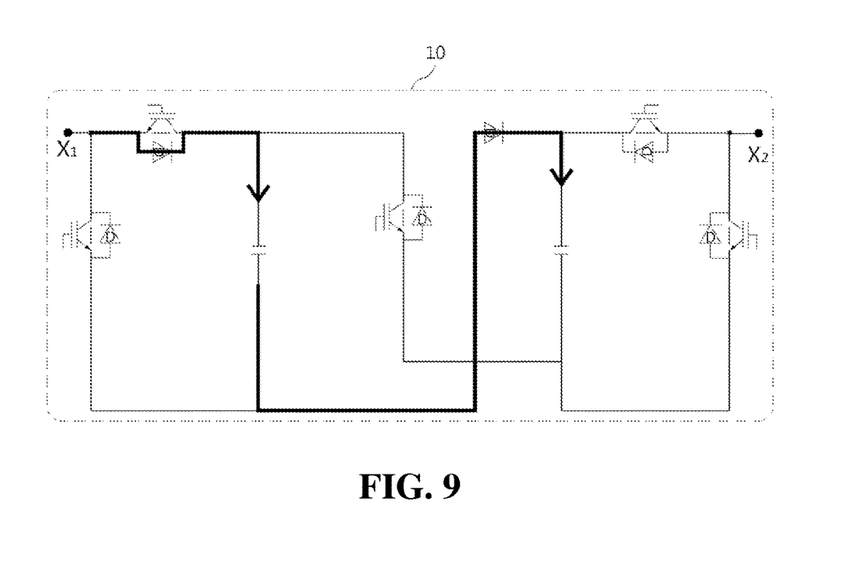
FIG. 9 is a diagram showing the flows of fault current according to an example of the present invention.
Figure 10:
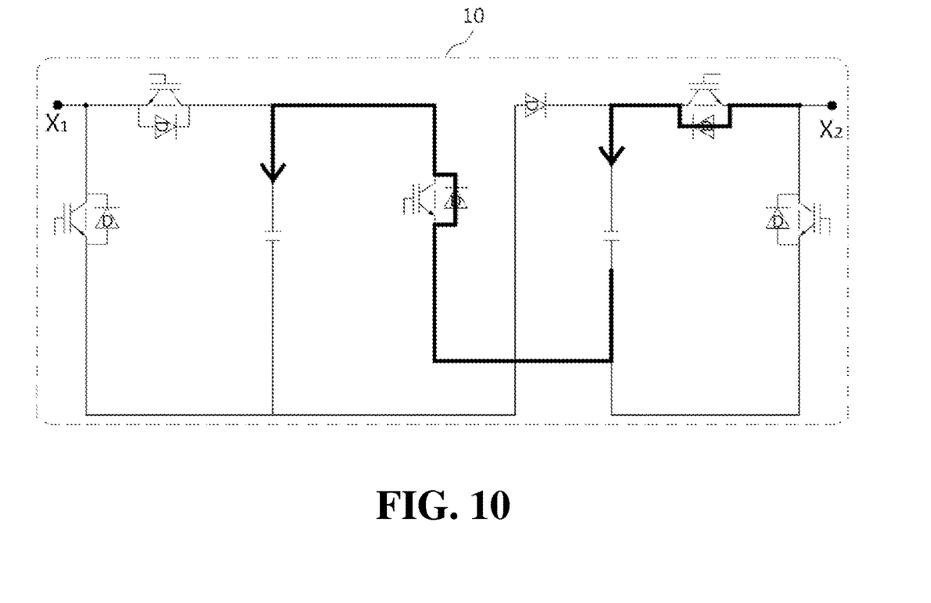
FIG. 10 is a diagram showing the flows of fault current according to another example of the present invention.

FIGS. 9 and 10 are diagrams showing the flows of fault current in the sub-module according to the present invention.

As shown in FIG. 9, when fault current flows from the system into the sub-module 10 (in the direction of X1→X2), the fault current flows into the first energy storage unit 110 through the first power semiconductor 120 of the first half-bridge unit 100, and, at the same time, the fault current flows into the second energy storage unit 210 through the diode 320 of the auxiliary circuit unit 300.

Furthermore, as shown in FIG. 10, when fault current flows into the sub-module 10 in a system direction (the direction of X2→X1), the fault current flows into the second energy storage unit 210 through the second power semiconductor 220 of the second half-bridge unit 200, and, at the same time, the fault current flows into the first energy storage unit 110 through the third power semiconductor 310 of the auxiliary circuit unit 300.

As described above, comparing the flows of fault current in the sub-module according to the present invention auxiliary with the flows of fault current in the conventional sub-module shown in FIGS. 4 and 5, the circuit unit 300 is configured such that the fault current flows into each of the energy storage units 110 and 210, thereby reducing or blocking the fault current. In this case, the sub-module of the present invention does not require the diode 9, unlike the conventional sub-module, while reducing or blocking fault current at a level equal or higher than that of the conventional sub-module. This means that the effects of the simplification of the configuration and the reduction in cost can be achieved.

Accordingly, in the converter of the present invention, when a plurality of sub-modules are configured, two half-bridge units are provided, an auxiliary circuit unit is disposed therebetween, and the auxiliary circuit unit is implemented using a single power semiconductor and a single diode, thereby reducing the number of diodes by one compared to the conventional sub-module while maintaining the same output and performance as the conventional sub-module. Due to this reduction in the number of diodes, the reduction in manufacturing cost can be achieved and the simplification of the configuration can be also achieved. In the present invention, the auxiliary circuit unit may be configured in various forms.

It is noted that although the present invention has been described in detail using the preferred embodiments, the present invention is not limited to the content of these embodiments. It will be apparent to those having ordinary knowledge in the technical field to which the present invention pertains that various modifications and improvements to the present invention, although these are not presented in the embodiments, can be made without departing from the range of the description of the attached claims, and all these modification and improvements fall within the technical range of the present invention. Therefore, the true range of the technical protection of the present invention should be defined based on the technical spirit of the attached claims.

The invention claimed is:

1. A converter comprising a plurality of sub-modules connected in series to each other, wherein:
   each of the sub-modules comprises:
   a first half-bridge unit comprising a first energy storage unit, and a plurality of first power semiconductors connected in parallel to the first energy storage unit and connected in series to each other;
   a second half-bridge unit comprising a second energy storage unit, and a plurality of second power semiconductors connected in parallel to the second energy storage unit and connected in series to each other; and an auxiliary circuit unit connecting the first half-bridge unit and the second half-bridge unit;

wherein the auxiliary circuit unit comprises a single third power semiconductor and a single diode, wherein a collector terminal of the single third power semiconductor is directly connected to a positive terminal of the first energy storage unit and an emitter terminal of the single third power semiconductor is directly connected to a negative terminal of the second energy storage unit, and wherein an anode terminal of the single diode is directly connected to a negative terminal of the first energy storage unit and a cathode terminal of the single diode is directly connected to a positive terminal of the second energy storage unit.

2. The converter of claim 1, wherein when fault current flows into a sub-module of the plurality of sub-modules, the fault current is supplied to each energy storage unit of the first and second half-bridge units through any one of the single third power semiconductor and the single diode of the auxiliary circuit unit.

3. The converter of claim 2, wherein the fault current is supplied to the second energy storage unit through the single third power semiconductor of the auxiliary circuit unit when the fault current flows in a first direction, and the fault current is supplied to the first energy storage unit through the single diode of the auxiliary circuit unit when the fault current flows in an opposite direction to the first direction.

4. The converter of claim 1,

A converter comprising a plurality of sub-modules connected in series to each other, wherein:

each of the sub-modules comprises:

a first half-bridge unit comprising a first energy storage unit, and a plurality of first power semiconductors connected in parallel to the first energy storage unit and connected in series to each other;

a second half-bridge unit comprising a second energy storage unit, and a plurality of second power semiconductors connected in parallel to the second energy storage unit and connected in series to each other; and an auxiliary circuit unit connecting the first half-bridge unit and the second half-bridge unit;

wherein the auxiliary circuit unit comprises a single third power semiconductor and a single diode, wherein the third power semiconductor is connected in parallel to the first energy storage unit, and the diode is connected in series to the first energy storage unit, wherein a collector terminal of the single third power semiconductor is directly connected to a positive terminal of the first energy storage unit, an anode terminal of the single diode is directly connected to a negative terminal of the first energy storage unit, and a common connection point of an emitter terminal of the single third power semiconductor and a cathode terminal of the single diode is directly connected to a negative terminal of the second energy storage unit.

5. A converter comprising a plurality of sub-modules connected in series to each other, wherein:

each of the sub-modules comprises:

a first half-bridge unit comprising a first energy storage unit, and a plurality of first power semiconductors connected in parallel to the first energy storage unit and connected in series to each other;

a second half-bridge unit comprising a second energy storage unit, and a plurality of second power semiconductors connected in parallel to the second energy storage unit and connected in series to each other; and an auxiliary circuit unit connecting the first half-bridge unit and the second half-bridge unit;

wherein the auxiliary circuit unit comprises a single third power semiconductor and a single diode, wherein the single third power semiconductor is connected in parallel to the second energy storage unit and is further connected in series to the first energy storage unit, and the single diode is connected in series to the second energy storage unit, wherein an emitter terminal of the single third power semiconductor is directly connected to a negative terminal of the second energy storage unit, a cathode terminal of the single diode is directly connected to a positive terminal of the second energy storage unit, and a common connection point of a collector terminal of the single third power semiconductor and an anode terminal of the single diode is directly connected to a positive terminal of the first energy storage unit.

* * * * *